United States Patent [19]
Touro et al.

[11] Patent Number: 5,236,676
[45] Date of Patent: Aug. 17, 1993

[54] PRESSURE CHLORINATION OF REFRACTORY GOLD ORES

[75] Inventors: Freddie J. Touro, New Orleans; Roy A. Pickren, Baton Rouge, both of La.

[73] Assignee: Freeport-McMoRan, Inc., New Orleans, La.

[21] Appl. No.: 897,000

[22] Filed: Jun. 11, 1992

[51] Int. Cl.$^5$ .............................................. C22B 3/12
[52] U.S. Cl. ............................................................ 423/29
[58] Field of Search ............................... 423/29, 30, 31

[56] References Cited

U.S. PATENT DOCUMENTS

| | | |
|---|---|---|
| 3,846,124 | 11/1974 | Guay . |
| 4,038,362 | 7/1977 | Guay ........................................ 423/40 |
| 4,188,208 | 2/1980 | Guay . |
| 4,289,532 | 9/1981 | Matson et al. . |
| 4,552,589 | 11/1985 | Mason et al. . |
| 4,738,718 | 4/1988 | Bakshani et al. . |
| 4,923,510 | 5/1990 | Ramadorai et al. ................... 423/30 |
| 4,979,986 | 12/1990 | Hill et al. ................................ 423/29 |

Primary Examiner—Melvyn J. Andrews
Attorney, Agent, or Firm—Fisher, Christen & Sabol

[57] ABSTRACT

A method and apparatus are described for recovering gold from aqueous slurries of refractory gold ores containing sulfidic and/or carbonaceous matter. The method entails pretreating an ore slurry with chlorine in a multi-compartment autoclave operated at an elevated pressure. The chlorine used in this pressure chlorination pretreatment can be in either the gaseous or liquid state. Following the removal of residual chlorine from the pretreated ore slurry, said slurry is transferred to a conventional cyanide leach/carbon adsorption circuit to recover the gold values.

23 Claims, 2 Drawing Sheets

PRESSURE CHLORINATION OF REFRACTORY GOLD ORES

FIELD OF THE INVENTION

This invention relates to a method for the recovery of gold from gold-containing, refractory ores. More specifically, the invention relates to the chlorination of refractory ores at elevated pressures to render such ores amenable to gold leaching by conventional cyanidation technology.

BACKGROUND ART

In recent years the mining industry has become increasingly involved with the development of methods for extracting gold from complex refractory ores. This trend is due to the increasing scarcity of free milling gold ore deposits. Gold ores are considered refractory when their gold content cannot be recovered by standard cyanidation techniques. Such ores are often refractory because of their excessive content of metallic sulfides or organic carbonaceous matter or both. It is not clearly understood why the sulfides and carbonaceous material cause such gold ores to be refractory, but the phenomenon is well known in the mining industry.

The treatment of refractory gold ores is the object of several recently developed processes. U.S. Pat. No. 4,289,532 to Matson et al treats carbonaceous ores with oxygen and chlorine prior to a cyanidation step. Matson's oxygenation step is carried out at atmospheric pressure and slightly elevated temperatures, i.e. 120°-210° F., and is followed by a chlorination step which is also conducted at atmospheric pressure and at a temperature of 70° to 140° F. Matson's oxygenation typically requires between 4 and 20 hours and preferably about 8 hours. In Matson's examples, chlorination is typically conducted with a retention time of 4 to 6 hours. The commercial implementation of this technology necessitates the utilization of large equipment in the oxygenation and chlorination sections of the gold mill to provide for the required retention times.

Other U.S. patents involving oxygenation and/or chlorination suffer from similar retention time requirements. For example, U.S. Pat. No. 3,846,124 utilizes a pretreatment using a chlorination step extending over a period of about 24 hours. U.S. Pat. No. 4,188,208 utilizes oxygenation for a period of about 24 hours. U.S. Pat. No. 4,188,208 utilizes oxygenation for a period of 8 hours prior to cyanidation of the gold ore. U.S. Pat. No. 4,038,362 discloses a process for the pretreatment of refractory gold ores in which an aqueous slurry of the ore is first oxidized with air over a period of 8 to 24 hours and then with chlorine for another 8 hours.

While all of the processes claimed in the foregoing patents operate at atmospheric pressures, other processes have been developed which operate at elevated oxygen pressures. For example U.S. Pat. Nos. 4,552,589 and 4,738,718 disclose processes in which refractory gold ores are subjected to elevated oxygen pressures in autoclaves. Even in the more extreme ranges of temperature (400°-500° F.) and oxygen overpressure (50-100 psig) cited in the '718 patent, autoclave retention times of about 4 hours are required to obtain gold extractions of about 90%. These processes also suffer from the further disadvantage that both require preheating of the ore to above 300° F.

In light of the foregoing, a need exists for a method of treating refractory gold ores wherein the retention time of the treatment step is minimized and the ore slurry does not require heating prior to the treatment.

Accordingly, it is an object of this invention to provide a method for treating refractory gold ores to render such ores amenable to conventional cyanidation technology, said method requiring minimal retention time and minimal heat input.

Furthermore, it is an object of the present invention to provide an economically advantageous method for treating refractory gold ores to make them amenable to conventional gold leaching techniques.

These and other objects of the invention will become apparent from the description of the invention.

SUMMARY OF THE INVENTION

This invention provides a method and apparatus for recovering gold from refractory gold ores. The method comprises pretreatment of an ore slurry with chlorine at an elevated pressure, i.e., superatmospheric pressure, followed by removal of residual chlorine from the slurry and conventional cyanide leach/carbon adsorption treatment to recover the gold values.

The slurry of refractory gold ore to be treated with chlorine in the method of this invention is prepared by slurrying ground ore with water. The ore should be ground to about 100% −70 Tyler mesh, and preferably 100% −100 Tyler mesh. Conventional dry grinding or wet grinding circuits may be utilized to achieve the desired ore grind. The solids content of the ore slurry should be 30% to 55%, and preferably 40% to 50%.

The aqueous slurry of refractory gold-containing ore is treated with elemental chlorine at a pressure of 15 to 100 psig, and preferably 20 to 50 psig. Compressed gaseous and/or liquid chlorine may be used in the practice of this invention. In the preferred embodiment of this invention compressed gaseous chlorine is utilized to treat a slurry of refractory gold ore.

Inasmuch as most gold ores contain carbonate minerals, the $CO_2$ gas generated during the course of the chlorination treatment contributes to the total pressure prevailing in the chlorination apparatus and should be continuously or periodically removed or vented from the reaction system.

The duration of the pressurized chlorine injection into the ore slurry in accordance with this invention is about 5 to 45 minutes, and preferably about 5 to 30 minutes. The specific chlorination time to be selected to treat a given ore depends on the amount of chlorine to be introduced, on the chlorine pressure employed, and on other factors, such as agitation, venting of the chlorination apparatus, etc., and is preferably selected on the basis of experimentation with the ore to be treated.

The amount of chlorine utilized in the method of this invention is dictated by the nature of the ore and usually exceeds 20 pounds of chlorine per ton of ore. For highly refractory ores the chlorine demand exceeds 100 pounds per ton of ore.

The treatment of an aqueous slurry of refractory gold ore with chlorine at an elevated pressure invariably results in a pH decrease of the slurry. The inventors have found that at pH levels below about 3.5 the effectiveness of the chlorination pretreatment declines. The pH of the slurry should, therefore, be maintained above 3.5. In the case of ores which do not posses adequate natural alkalinity, the desired pH control is attained through the addition of an alkaline material, preferably caustic soda or soda ash, prior to and/or during chlorination.

The pressure chlorination method of this invention does not require heating of the ore slurry prior to or during the chlorination step. Ambient temperatures of the feed slurry ranging from 32° to 100° F. are satisfactory. Preferably, the temperature of the slurry fed to the pressure chlorination apparatus is in the range of 50° to 90° F. Due to the heat of the chemical reactions associated with the pressure chlorination treatment of a gold ore slurry, the temperature of the slurry usually rises by about 10° to 30° F. during the chlorination. The relatively mild temperatures prevailing in the pressure chlorination method of this invention are in clear contrast to the conditions of pressure oxygenation of ore slurries which calls for operating temperatures well in excess of 300° F.

Following the chlorination pretreatment of this invention, the ore slurry is subjected to a process step resulting in the removal of residual chlorine, for example to a treatment with sodium hydrogen sulfide (NaHS) or sodium sulfite in an amount approximately equivalent to the level of residual chlorine. The ore slurry is then passed to a conventional cyanide leach/carbon adsorption circuit where gold is leached from the ore and adsorbed onto granular carbon for subsequent recovery.

Gold ores suitable for the chlorination treatment of this invention contain organic carbonaceous and/or sulfidic matter and are refractory to direct gold leaching by conventional cyanidation. The levels of organic and sulfidic components of the gold ore will obviously impact the chlorine requirements and the costs associated with the chlorination treatment. Those skilled in the art will recognize that at very high levels of carbonaceous and/or sulfidic matter the costs of pressure chlorination may become excessive, depending on the gold content of the ore, the market value of the recovered gold, and other factors. Thus, other processes may be preferred for gold ores containing excessive levels of carbonaceous and/or sulfidic material.

The pressurized chlorination pretreatment of this invention is preferably carried out in a multi-compartmental agitated autoclave apparatus described in more detail herein below. Alternately, the pressurized chlorination pretreatment is carried out in a suitable pipe reactor. Preferably, the pressurized chlorination pretreatment is practiced in a continuous manner, but batch chlorination is also feasible.

DETAILED DESCRIPTION OF THE INVENTION

Figure 1:
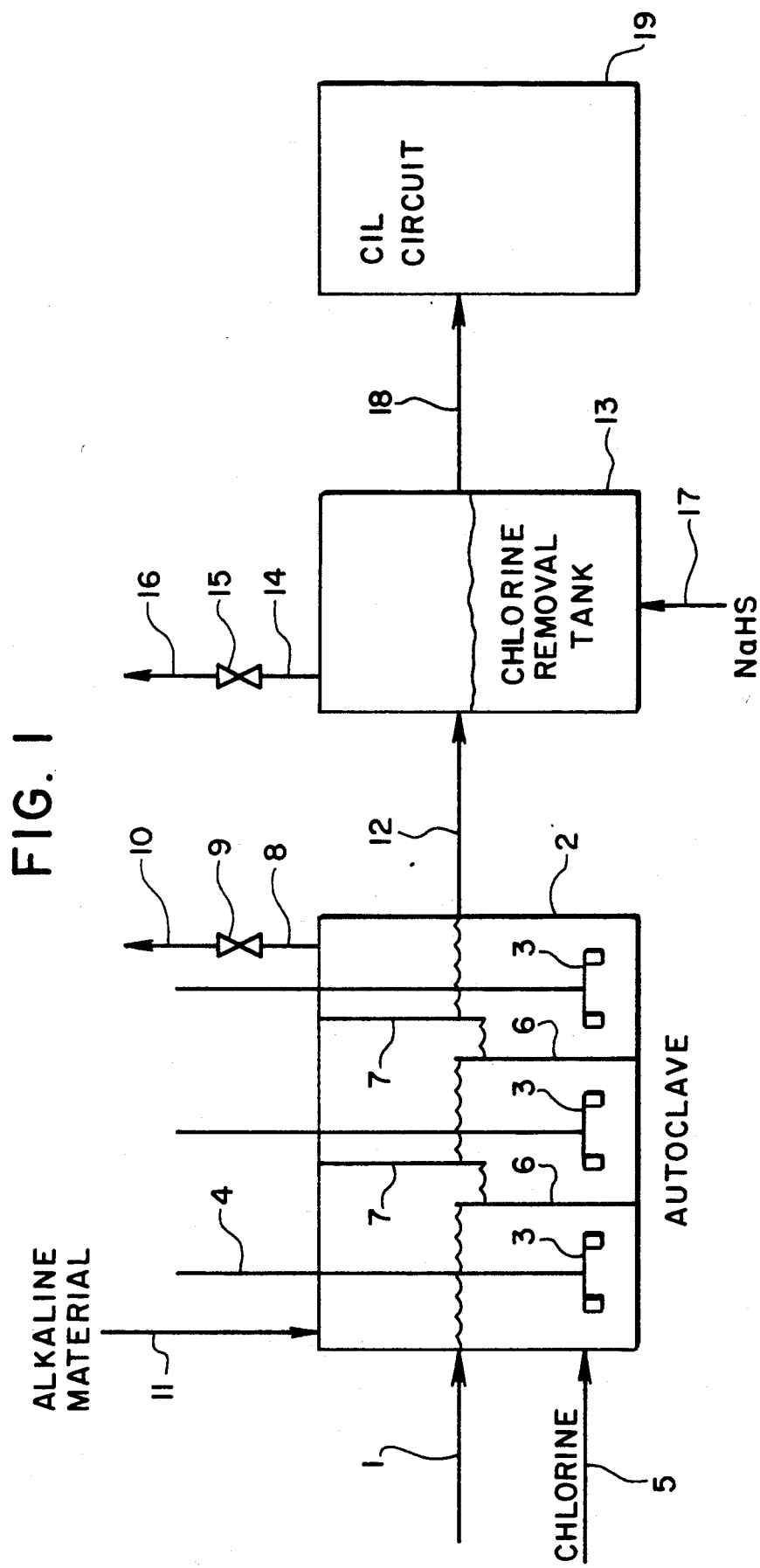
FIG. 1 is a block diagram of the preferred embodiment of the invented method wherein the chlorine injected into the ore slurry to treat the gold ore is in the gaseous state.

In one preferred embodiment of the invention, compressed gaseous chlorine is used as the chlorinating agent. Referring to FIG. 1, an aqueous slurry of refractory gold ore, having a solids content of 40% to 50%, a particle size distribution of about −100 mesh, and a temperature in the range of 50° to 90° F., is passed via line 1 to autoclave 2 which is equipped with agitators 3 mounted on vertical shafts 4. Chlorine gas enters the autoclave 2 via line 5. The chlorine and ore slurry are mixed thoroughly by the system of agitators 3 and shafts 4 which is designed to provide for effective slurry/gas contact. For example, the sections of shafts 4 which are within the confines of the autoclave 2 may be hollow and machined so as to enable the recirculation of the gas phase into the slurry phase. Preferably, the nominal retention time of the ore slurry in autoclave 2 is between about 5 and 30 minutes, depending primarily upon the amount of chlorine to be introduced, as mandated by the nature of the ore.

The autoclave 2 is further equipped with slurry phase baffles 6 and gas phase baffles 7 to create several compartments within autoclave 2. FIG. 1 depicts an arrangement wherein the autoclave is divided into three slurry phase compartments and three gas phase compartments, but fewer or more compartments may be employed in the practice of this invention. The compartmentalization of autoclave 2 serves to reduce the amount of unreacted residual chlorine remaining in the slurry and gas leaving said autoclave.

If the ore contains carbonate minerals, the decrease in the pH of the slurry caused by the introduction of chlorine results in the generation of carbon dioxide gas which will tend to build up in the vapor space of the autoclave 2. Such buildup of $CO_2$ has been found to adversely impact the effectiveness of the chlorination method and, therefore, the $CO_2$, along with some residual unreacted chlorine gas, is vented periodically or continually from autoclave 2 via lines 8 and 10, and valve 9, while maintaining the pressure in autoclave 2 in the range of 20 to 50 psig.

The chemical reactions occurring in the autoclave 2 lead to the formation of hydrochloric acid which causes the pH of the ore slurry contained in the autoclave 2 to drop. The inventors have found that chlorine decomposes rapidly below a pH of 3.5 requiring an increase in chlorine usage per ton of ore treated. For that reason the pH of the ore slurry in autoclave 2 is maintained above 3.5. If the ore does not contain adequate natural alkalinity, pH control of the ore slurry is attained through the addition of an alkaline material, preferably caustic soda or soda ash, through line 11.

The chlorinated ore slurry is transferred from autoclave 2 by line 12 to chlorine removal tank 13 which is held at atmospheric pressure. Carbon dioxide gas liberated along with some of the residual unreacted chlorine as a result of the transfer of the pressurized ore slurry to the atmospheric pressure conditions prevailing in the chlorine removal tank is vented from chlorine removal tank 13 through lines 14 and 16 and valve 15. The gases, as well as those vented through lines 8 and 10, may be passed to a scrubber to recover and recycle the residual chlorine values. A chlorine-reducing compound, e.g. NaHS, is added to chlorine removal tank 13 via line 17, to react with and thereby eliminate residual chlorine and hypochlorite compounds from the ore slurry.

The ore slurry free of unreacted chlorine is next transferred via line 18 to a conventional cyanide leach/carbon adsorption circuit 19, i.e. a carbon-in-pulp or carbon-in-leach circuit where gold is leached from the chlorinated ore and adsorbed onto carbon. Such cyanide leach/carbon adsorption circuits and associated methods for the recovery of gold from the loaded carbon are well known in the gold mining industry, e.g. U.S. Pat. No. 4,289,532 to Matson.

Figure 2:
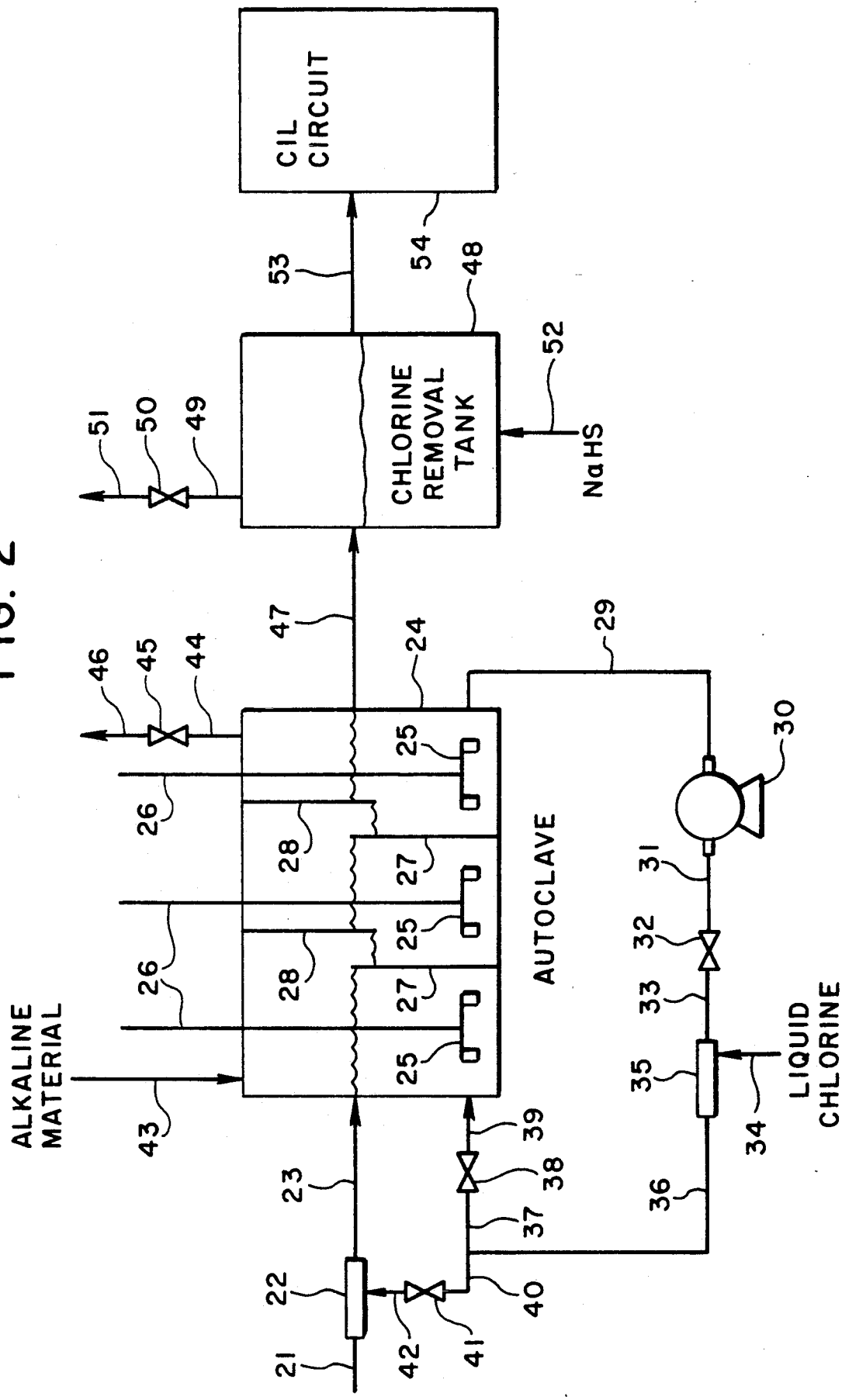
FIG. 2 is a block diagram of an alternate preferred embodiment of the invented method wherein the chlorine injected into the ore slurry to treat the gold ore is in the liquid state.

In another embodiment of the invention, liquid chlorine is used as the chlorinating agent. Referring to FIG. 2, an aqueous slurry of refractory gold ore, preferably having a solids content of 40% to 50%, a particle size distribution of about 100 mesh, and a temperature in the range of 50° to 90° F., is passed by lines 21 and 23 and mixing chamber 22 to autoclave 24. Autoclave 24 is equipped with agitators 25 mounted on shafts 26, and with slurry phase baffles 27 and gas phase baffles 28 which serve to compartmentalize the autoclave 24. A portion of the ore slurry contained in autoclave 24 is recycled via pump 30, mixing chamber 35, open valves 32 and 38, and lines 29, 31, 33, 36, 37, and 39 to autoclave 24. The amount of slurry to be recirculated depends on the refractory nature of the ore, i.e. the more refractory the ore, the more recirculation may be employed to accommodate the liquid chlorine requirements of the chlorination step. Liquid chlorine is injected into mixing chamber 35 where it mixes with the recycle slurry entering mixing chamber 35 via line 33, and passes with the recycle slurry to autoclave 24. Valve 41 would be closed during this mode of operation.

The slurry recirculation route may be varied by different arrangements of valves 32, 38, and 41. For example, the closure of valve 38 and the opening of valve 41 would allow the ore slurry-liquid chlorine recirculation stream to enter mixing chamber 22 and mix with the feed ore slurry prior to the ore slurry-liquid chlorine blend entering the autoclave. Alternately, closure of valves 32 and 38 coupled with the disengagement of recycle pump 30 and the opening of valve 41 would facilitate the injection of liquid chlorine directly into mixing chamber 22 via lines 34, 36, 40, and 42. The various operational options available via valve arrangements will be obvious to those skilled in the art. The options facilitate the handling of ores of differing refractory compositions.

Depending primarily on the amount of chlorine to be introduced into the slurry, the retention time of the slurry in autoclave 24 is between about 5 and 30 minutes.

Again, referring to FIG. 2, alkaline material may be added to autoclave 24 via line 43 for the reason previously discussed. Carbon dioxide gas, along with residual chlorine gas is vented from the autoclave by valve 45 and lines 44 and 46, while preferably maintaining the pressure in autoclave 24 in the range of 20 to 50 psig. The pressurized chlorinated ore slurry is then transferred from autoclave 24 via line 47 to chlorine removal tank 48 which is operated at atmospheric pressure by venting the gas phase via lines 49 and 51 and valve 50. A sulfide ion-providing compound, for example sodium hydrogen sulfide, is added to chlorine removal tank 48 via line 52, to eliminate residual chlorine and hypochlorite compounds from the slurry. As in the case of the preferred embodiment of the invention described hereinabove, the ore slurry free of unreacted chlorine is next transferred via line 53 to a conventional cyanide leach/carbon adsorption circuit 54, where the gold is leached from the chlorinated ore and adsorbed onto carbon.

The following examples will serve to illustrate the concepts of the invention. The examples should not be construed as to limit, in any manner, the invention.

EXAMPLES

The two ore samples, labeled A and B, used in the following examples were obtained from the Jerritt Canyon deposit located near Elko, Nev. While both ores used in these examples are considered refractory, the reason for their refractoriness is not completely understood. Both ore samples were ground to 100% −100 Tyler mesh; a controlled grind was performed using alternate screening at 100 mesh and regrinding only the +100 mesh material to minimize the generation of fines. The major constituents of the ore samples are given in Table 1. Based on their organic carbon and total sulfur contents, it is evident that both of these ores are very refractory to direct cyanidation/adsorption treatments. The selection of these ores for use in the examples does not imply that the method of this invention is only or preferably applicable to highly refractory ores. On the contrary, ores with lower organic carbon and total sulfur contents can be treated in accordance with this invention with equal ease and at lower reagent cost. All percentages in Table 1 are by weight.

TABLE 1

| Ore I.D. | Au oz/ton | Organic Carbon % | Total Sulfur % | Ca % | Mg % | $CO_3$ % | $SO_4$ % |
|---|---|---|---|---|---|---|---|
| A | 0.26 | 1.10 | 1.26 | 10.0 | 5.2 | 25.8 | 0.29 |
| B | 0.28 | 1.16 | 1.25 | 10.6 | 5.5 | 29.2 | 0.55 |

COMPOSITION OF GOLD-CONTAINING ORES USED IN EXAMPLES

EXAMPLES 1 THROUGH 3

A series of three tests was conducted on the refractory gold-containing ore referred to in Table 1 as Ore A, which is a Jerritt Canyon Roberts Mountain Sitstone. The object of the tests was to demonstrate the effect of chlorine pressure during the chlorination of an ore slurry on the efficiency of subsequent gold leaching using a standard cyanidation procedure. In each test, 400 grams of ore slurry containing 50% solids were charged into a 1 liter autoclave and pressurized with chlorine for a period of 30 minutes. The chlorine pressures maintained in Examples 1, 2, and 3 were 10, 25, and 50 psig, respectively. Continuous venting was employed in the three examples to remove the $CO_2$ generated during the course of chlorination. The ore slurry utilized in these examples was at an ambient temperature of 75° F. and was not preheated prior to chlorination; however, during the course of each test, the temperatures of the slurries rose to about 100° F. to 120° F.

Following the 30 minute chlorination, the slurries were treated with sodium sulfite to consume excess hypochlorite. A sample of each slurry was taken and the pH of each sample was adjusted to a value of about 10.0-10.5 by adding lime. Sodium cyanide was added in an amount equivalent to 5 pounds per ton of ore solids. Westates brand activated granular carbon (6×16 mesh size) was added in an amount equivalent to 20 grams per liter of slurry. Gold leaching and adsorption procedures were then performed on the slurry using rolling bottles to agitate the slurry. Following the 24 hour agitation period, the bottles were opened, the gold laden carbon was separated from the slurries and the slurries, in turn, were separated into solid ore tailings and liquid fractions. Both solid and liquid fractions were then analyzed for gold content. The gold extractions shown in Table 2 are based on ore feed and tailings assays.

TABLE 2
EFFECT OF CHLORINATION PRESSURE ON THE EFFICIENCY OF GOLD REMOVAL DURING SUBSEQUENT CYANIDATION

| Example No. | Chlorine Pressure (psig) | Gold Extraction (%) |
| --- | --- | --- |
| 1 | 10 | 65 |
| 2 | 25 | 84 |
| 3 | 50 | 88 |

The data presented in Table 2 clearly demonstrate the benefit of chlorinating refractory gold ores at pressures higher than atmospheric pressure.

EXAMPLES 4 THROUGH 6

Examples 4 through 6 were conducted on ore designated in Table 1 as Ore B. The object of these tests was to demonstrate the effectiveness of pressure chlorination at retention times significantly shorter than the retention times of prior art. In Examples 4 through 6, 445 grams of ore slurry containing 45% solids were charged into a one liter autoclave and pressurized with 50 psig of chlorine for a period of 3, 6, and 9 minutes, respectively. The autoclave was vented and repressurized with chlorine at three minute intervals, i.e. in Example 4 venting took place only at the end of the three minute test, in Example 5 the autoclave was vented halfway through the six minute test and upon completion of the test, and in Example 6 the autoclave was vented at three and six minutes of chlorination and upon completion of the test. The ore slurry utilized in these tests was at an ambient temperature of 75° F., i.e. it was not preheated prior to chlorination; however during the course of each test, the temperature of the slurries rose to about 115°–130° F., depending on the duration of the test.

Following chlorination the slurries were processed as in Examples 1 trough 3. The gold extractions shown in Table 3 are based on ore feed and tailing assays.

TABLE 3
EFFECTIVENESS OF PRESSURIZED CHLORINATION WITH LIMITED RETENTION TIME ON THE EFFICIENCY OF GOLD REMOVAL DURING SUBSEQUENT CYANIDATION

| Example No. | Retention Time (min.) | Gold Extraction (%) |
| --- | --- | --- |
| 4 | 3 | 35 |
| 5 | 6 | 78 |
| 6 | 9 | 87 |

The data presented in Table 3 demonstrate that effective gold extractions can be obtained when cyanidation takes place subsequent to pressure chlorination with retention times in a five to ten minute range. While the retention time for the pressure chlorination step in accordance with the method of this invention will vary depending on the nature of the ore and the chlorination pressure employed, it is evident that retention times required for the pressure chlorination are substantially shorter than those needed for chlorination at atmospheric pressure in accordance with prior art.

EXAMPLES 7 THROUGH 9

Examples 7 through 9 were conducted on ore designated in Table 1 as Ore A. The object of Examples 7 through 9 was to demonstrate the effect of venting the carbon dioxide-containing gases during pressure chlorination upon subsequent gold leaching using a standard cyanidation. In each example 666 grams of slurry containing 30% solids were charged into a one liter autoclave and pressurized with 50 psig of chlorine for a period of thirty minutes. In Example 7 the gas content of the autoclave was not vented, in Example 8 the gas content of the autoclave was released after six minutes of pressure chlorination and the autoclave was repressurized with 50 psig of chlorine for the remaining 24 minutes of chlorination. In Example 9 the gas content of the autoclave was released after five minutes of pressure chlorination and was repressurized with 50 psig of chlorine for an additional five minutes at which time the pressure was again released and the autoclave repressurized with 50 psig of chlorine for the remaining 20 minutes of chlorination.

Following chlorination, the slurries were processed as in Examples 1 through 3. The gold extractions shown in Table 4 are based on ore feed and tailings assays.

TABLE 4
EFFECT OF VENTING DURING PRESSURIZED CHLORINATION ON THE EFFICIENCY OF GOLD EXTRACTION DURING SUBSEQUENT CYANIDATION

| Example No. | No. of Ventings | Gold Extraction (%) |
| --- | --- | --- |
| 7 | 0 | 84.0 |
| 8 | 1 | 90.7 |
| 9 | 2 | 92.5 |

The results presented in Table 4 demonstrate the favorable impact of venting the pressurized vessel during pressure chlorination upon gold extraction during subsequent cyanidation.

What is claimed is:

1. In a method for recovering gold from refractory gold ore wherein an aqueous slurry of said gold ore is treated with chlorine and subjected to subsequent cyanidation, the improvement of increasing the yield of recovered gold comprising treating said slurry with chlorine at an elevated pressure in an autoclave, wherein said autoclave is vented during chlorine treatment of said slurry.

2. The improvement of claim 1 wherein the solids content of the slurry is 30 to 55%.

3. The improvement of claim 1 wherein the chlorine treatment is conducted at a pressure of between 15 psig and 100 psig.

4. The improvement of claim 1 wherein the chlorine treatment is conducted at a pressure of between 20 psig and 50 psig.

5. The improvement of claim 1 wherein the chlorine used is compressed gaseous chlorine.

6. The improvement of claim 1 wherein the chlorine used is liquid chlorine.

7. The improvement of claim 1 wherein the slurry is maintained at a pH above about 3.5.

8. The improvement of claim 1 wherein the refractory nature of the ore is caused by its content of sulfidic and carbonaceous matter.

9. The improvement of claim 1 wherein the duration of treatment with chlorine is between about 5 and 45 minutes.

10. The improvement of claim 1 wherein the temperature of the slurry to be subjected to treatment with chlorine is in the range of about 32° to 100° F.

11. The improvement of claim 1 wherein the chlorine-treated slurry is subjected to a chlorine removal step before said subsequent cyanidation.

12. The improvement of claim 1 wherein the treatment of the ore slurry with chlorine is conducted in a continuous manner.

13. The improvement of claim 1 wherein the treatment of the ore slurry with chlorine is conducted in a batch mode.

14. A method for the recovery of gold from refractory gold ores comprising the steps of:
   a) forming an aqueous slurry of ground gold-containing ore;
   b) treating said slurry with chlorine at an elevated pressure in an autoclave, wherein said autoclave is vented during chlorine treatment of said slurry;
   c) depressurizing said slurry and removing residual chlorine from said slurry;
   d) leaching gold values from said slurry with cyanide.

15. The method of claim 14 wherein said slurry contains 40 to 50% solids.

16. The method of claim 14 wherein said autoclave is operated at a pressure of between about 15 psig and 100 psig.

17. The method of claim 14 wherein said slurry is treated with gaseous chlorine.

18. The method of claim 14 wherein said slurry is treated with liquid chlorine.

19. The method of claim 14 wherein said slurry has a nominal retention time of about 5 to 45 minutes in said autoclave.

20. The method of claim 14 wherein the pH of said slurry is maintained above about 3.5.

21. The method of claim 14 wherein the temperature of said formed aqueous slurry is between about 32° and 100° F.

22. The method of claim 14 wherein residual chlorine is removed from said slurry through depressurization and treatment of said slurry with a chlorine reducing agent.

23. The method of claim 14 wherein said autoclave is compartmentalized and agitated.

* * * * *